United States Patent
Saitoh et al.

(10) Patent No.: US 6,747,939 B2
(45) Date of Patent: Jun. 8, 2004

(54) SEMICONDUCTOR LASER DEVICE AND OPTICAL PICKUP DEVICE USING THE SAME

(75) Inventors: Yukio Saitoh, Kyoto (JP); Shoichi Takasuka, Osaka (JP); Naoki Nakanishi, Shiga (JP); Hideyuki Nakanishi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 430 days.

(21) Appl. No.: 09/793,675

(22) Filed: Feb. 26, 2001

(65) Prior Publication Data

US 2001/0019530 A1 Sep. 6, 2001

(30) Foreign Application Priority Data

Mar. 1, 2000 (JP) .................................. 2000-056355

(51) Int. Cl.[7] .................................. G11B 7/00
(52) U.S. Cl. ............. 369/121; 369/112.28; 369/44.12
(58) Field of Search ........................ 369/94, 275.3, 369/44.29, 44.21, 44.22, 44.28, 44.12, 112.04, 112.05, 112.28, 116, 121, 44.23, 44.27

(56) References Cited

U.S. PATENT DOCUMENTS

| | | | |
|---|---|---|---|
| 5,233,187 A | 8/1993 | Sakata et al. | |
| 5,287,376 A | 2/1994 | Paoli | |
| 5,625,609 A | * 4/1997 | Latta et al. | 369/94 |
| 5,748,658 A | 5/1998 | Nakanishi et al. | |
| 6,185,176 B1 | 2/2001 | Sugiura et al. | |
| 6,388,977 B1 | * 5/2002 | Sakai et al. | 369/94 |

FOREIGN PATENT DOCUMENTS

| | | |
|---|---|---|
| EP | 0 810 589 | 12/1997 |
| EP | 0 860 819 | 8/1998 |
| EP | 11-261172 | 9/1999 |
| JP | 4-139628 | 5/1992 |
| JP | 4-240789 | 8/1992 |
| JP | 6-259804 | 9/1994 |
| JP | 10-320815 | 4/1998 |
| JP | 10-134388 | 5/1998 |
| JP | 2000-020288 | 6/1998 |
| JP | 10-320814 | 12/1998 |

* cited by examiner

Primary Examiner—Thang V. Tran
(74) Attorney, Agent, or Firm—Merchant & Gould P.C.

(57) ABSTRACT

A semiconductor laser device is provided which can carry out recording and reproduction with respect to optical disks with different formats. In this semiconductor laser device, a receiving/emitting optics integrated substrate, in which two semiconductor laser elements with different emission wavelengths and a plurality of receiving optics are integrated, is disposed in a case and is sealed with a hologram element. A composite prism is placed on the hologram element. The distances, when measured in air, from the two semiconductor laser elements to a focusing means, for example, a collimator lens are set to be substantially equal. Thus, a small and inexpensive semiconductor laser device can be obtained. In addition, a single collimator lens can be employed, and thus the optical configuration is facilitated.

18 Claims, 9 Drawing Sheets

SEMICONDUCTOR LASER DEVICE AND OPTICAL PICKUP DEVICE USING THE SAME

BACKGROUND OF THE INVENTION

1. Field of the Invention

The present invention relates generally to a semiconductor laser device used for reproducing information from optical disks with different formats, such as a compact disk (CD) and a digital video disk (DVD), in a single optical pickup device.

2. Related Background Art

Currently, the CD market is the largest market among the optical disk markets. In the device for reproducing information from CDs, a near infrared semiconductor laser element with a wavelength in a 780 nm to 800 nm band has been used. On the other hand, for recording and reproduction with respect to DVDs, which are optical media with higher recording density and are expected to come into wide use rapidly in the future, a red-color semiconductor laser element with a shorter wavelength in a 635 nm to 680 nm band has been used, since a light spot is required to have a small diameter. It has been requested to enable information to be recorded and reproduced with respect to two such kinds of optical disks with different standards in one device. An optical pickup device for such a purpose is described, for example, in JP 10(1998)-320815. FIG. 9 shows a configuration of a conventional optical pickup device.

An operational principle of the conventional optical pickup device is described with reference to FIG. 9 as follows.

For recording and reproduction with respect to a CD, a semiconductor laser element 101 with a wavelength of 780 nm is used. A beam 116 emitted from the semiconductor laser element 101 in the direction perpendicular to the surface of an optical disk 106 is diverged into three beams by a diffraction grating 115. A collimator lens 103 disposed on an optical axis converts the divergent beam into a parallel beam. The parallel beam goes through a wavelength deflection filter 109 and is focused on the optical disk 106 by an objective lens 105.

The beam reflected by the optical disk 106 is converted from a divergent beam into a parallel beam by the objective lens 105 and goes through the wavelength deflection filter 109 again. Subsequently, the beam is converted into a converged beam by the collimator lens 103 and then enters a hologram element 111. The beams divided by the hologram element 111 are detected as electric signals in receiving optics 113. Based on the detected signals, the reproduction and focusing/tracking servo are carried out with respect to the CD.

On the other hand, for recording and reproduction with respect to a DVD, a semiconductor laser element 102 with a wavelength of 635 nm (or 650 nm) is used. A beam 117 emitted from the semiconductor laser element 102 in a direction parallel to the surface of an optical disk 106 is converted from a divergent beam into a parallel beam by a collimator lens 104 disposed on an optical axis and goes through a polarization beam splitter 107 and a ¼ wavelength plate 108. Subsequently, the beam is reflected by the wavelength deflection filter 109 so that its path is deflected by 90°, and then is focused on the optical disk 106 by the objective lens 105.

The beam reflected by the optical disk 106 is converted from a divergent beam into a parallel beam by the objective lens 105 and is reflected by the wavelength deflection filter 109 again so that its path is deflected by 90°. Subsequently, its polarization direction is changed by the ¼ wavelength plate 108. Therefore, the beam entering the polarization beam splitter 107 is reflected so that its path is deflected by 90°, and then is converged by a detection lens 110. The converged beam goes through a cylindrical lens 112 and is detected as an electric signal in receiving optics 114. Based on this detection signal, reproduction and focusing/tracking servo are carried out with respect to the DVD.

In the above-mentioned configuration, the semiconductor laser with a wavelength of 780 nm is mounted and therefore recording and reproduction also can be carried out with respect to CD-Rs.

However, such a conventional optical pickup device as shown in FIG. 9 is configured with many optical components such as two semiconductor laser elements 101 and 102 with different emission wavelengths and a plurality of receiving optics 113 and 114 for respective beams emitted from the semiconductor laser elements 101 and 102, as well as the hologram element 111, the cylindrical lens 112, the wavelength deflection filter 109, and the like. Therefore, it is difficult to reduce the size of the device.

Moreover, since the respective optical components are disposed discretely, a lot of positional adjustments and fixation are required, and thus great amounts of time and cost are required for the assembly, which have been problems.

SUMMARY OF THE INVENTION

Therefore, the present invention was made to solve the aforementioned conventional problems. The present invention is intended to provide a small and inexpensive semiconductor laser device capable of carrying out recording and reproduction with respect to various optical disks with different formats and to provide an optical pickup device having the same.

In order to achieve the above-mentioned object, a semiconductor laser device according to the present invention includes a receiving/emitting optics integrated substrate and an optical element. In the receiving/emitting optics integrated substrate, a first semiconductor laser element, a second semiconductor laser element, and a plurality of receiving optics are integrated on a substrate. The first and second semiconductor laser elements have different emission wavelengths. A distance L1, when measured in air, from the first semiconductor laser element to a focusing member is substantially equal to a distance L2, when measured in air, from the second semiconductor laser element to the focusing member.

According to this configuration, the two semiconductor laser elements and the plurality of receiving optics are integrated in the receiving/emitting optics integrated substrate, so that a small and inexpensive semiconductor laser device can be provided. In addition, since the distances, when measured in air, from the two semiconductor laser elements to the focusing member are substantially equal, one single focusing member (for instance, a collimator lens) can be employed. Thus, the optical configuration is simplified.

In the semiconductor laser device according to the present invention, preferably, a difference between the distance L1 and the distance L2, when measured in air, is within ±50 μm.

According to this configuration, particularly the influence of aberration can be suppressed to a low level and it becomes easy to configure the optical pickup device employing a single focusing member.

In the semiconductor laser device according to the present invention, preferably, the optical element is disposed in an optical path at least between the first or second semiconductor laser element and the focusing member.

This configuration enables return light from the optical disk to diverge efficiently to be lead to the receiving optics.

In addition, it is preferable that the optical element includes a member allowing a distance for which a beam emitted from the first semiconductor laser element travels to go through the optical element to be different from a distance for which a beam emitted from the second semiconductor laser element travels to go through the optical element.

According to this configuration, the distances for which the two emitted beams travel to go through the optical element are made different, so that the distances, when measured in air, for which the two emitted beams travel after leaving the optical element can be made substantially the same.

It also is preferable that a light diverging member is formed in the optical element and a diffraction grating, a reflector, or the like is used as the light diverging member.

In the semiconductor laser device according to the present invention, preferably, the first semiconductor laser element has an emission wavelength in a 780 nm band, and the second semiconductor laser element has an emission wavelength in a 650 nm band.

According to this configuration, recording and reproduction can be carried out with respect to optical disks with both the CD format and the DVD format.

Preferably, the light diverging member exhibits different diverging efficiencies depending on wavelengths.

According to this configuration, for example, when a diffraction grating is used as the light diverging member, a semiconductor laser device can be obtained which has light diverging efficiencies optimized with respect to respective wave lengths through adjustment of the depth of the diffraction grating. When using this, therefore, an optical pickup device with excellent light utilization efficiency can be configured. Consequently, a low power consumption type optical pickup device can be obtained.

Furthermore, in the semiconductor laser device according to the present invention, it is preferable that the substrate is a silicon substrate with a principal plane that is a plane obtained when a plane equivalent to a plane (100) is rotated about an axis extending in a direction equivalent to a direction <0–11> by 5° to 15° in a direction equivalent to a direction <100>, concave portions are formed in the substrate, the first and second semiconductor laser elements are placed on bottom surfaces of the concave portions, and each beam emitted from the first and second semiconductor laser elements is reflected by one side face of the corresponding concave portion.

According to this configuration, when the concave portions are formed at the surface of the silicon substrate by anisotropic etching using a potassium hydroxide-based etchant, a plane equivalent to a plane (111) can be formed as one of side faces of each concave portion, having an angle of 40° to 50° with respect to the bottom surface of the concave portion. Therefore, when the first and second semiconductor laser elements are disposed on the bottom surfaces of the concave portions, the one of side faces of each concave portions serves as a reflecting mirror and thus emitted beams can be lead out upward in the direction substantially perpendicular to the silicon substrate. Furthermore, the plurality of receiving optics are formed in the area where the concave portions are not formed, so that the receiving/emitting optics integrated substrate can be configured easily.

In the semiconductor laser device according to the present invention, it is preferable that the receiving/emitting optics integrated substrate and the optical element are disposed in one case.

According to this configuration, a plurality of elements can be disposed in one case and the whole is sealed, so that the reliability can be improved easily. In addition, when this case is formed as one optical unit, its handling in the assembly of an optical pickup device is considerably easier as compared to the case where separate elements are handled. Thus, the assembly process and line can be simplified.

In order to achieve the above-mentioned object, an optical pickup device according to the present invention includes a focusing member and a semiconductor laser device provided with a receiving/emitting optics integrated substrate disposed in a case, and an optical element. In the receiving/emitting optics integrated substrate, a first semiconductor laser element, a second semiconductor laser element, and a plurality of receiving optics are integrated on a substrate. The first and second semiconductor laser elements have different emission wavelengths. The optical element is disposed in the same case as that including the receiving/emitting optics integrated substrate. A distance L1, when measured in air, from the first semiconductor laser element to the focusing member is substantially equal to a distance L2, when measured in air, from the second semiconductor laser element to the focusing member. The focusing member is positioned to be fixed to the case of the semiconductor laser device.

According to this configuration, the assembly process and line of the optical pickup device described above can be simplified.

Preferably, the optical pickup device according to the present invention further includes a supporting member, and the case and the supporting member are connected by a supporter, and the case is movably semifixed to the supporting member.

According to this configuration, all the optical components of the optical pickup device are integrally movable. Therefore, when the focusing/tracking servo is carried out with respect to an optical disk, no optical shift is caused and thus reliable recording and reproducing characteristics can be obtained.

In the semiconductor laser device according to the present invention, preferably, the first and second semiconductor laser elements are integrated in one chip.

According to this configuration, a plurality of semiconductor laser elements are integrated in one chip, so that a semiconductor laser device with a reduced number of components can be obtained. This enables the size of the optical pickup device to be reduced.

In addition, in the semiconductor laser device according to the present invention, it is preferable that the optical element is placed on the receiving/emitting optics integrated substrate.

According to this configuration, the optical element is placed on the receiving/emitting optics integrated substrate, so that a semiconductor laser device with a protected receiving/emitting optics integrated substrate can be obtained. Consequently, the reliability of the optical pickup device can be improved.

DETAILED DESCRIPTION OF THE INVENTION

Suitable embodiments of the present invention are described with reference to the drawings as follows.
First Embodiment A first embodiment of the present invention is described with reference to FIGS. 1 to 5 as follows.

Figure 1:
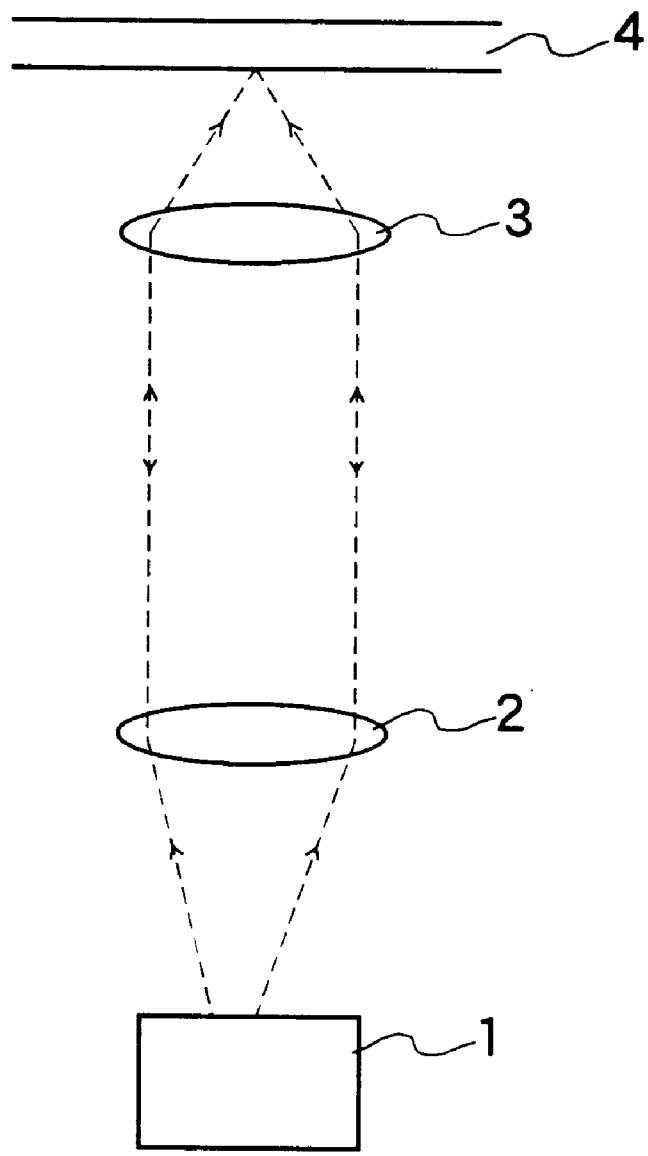
FIG. 1 is a schematic structural view of an optical pickup device having a semiconductor laser device according to a first embodiment of the present invention.

FIG. 1 is a schematic structural view of an optical pickup device having a semiconductor laser device according to the first embodiment of the present invention.

In FIG. 1, a beam emitted from a semiconductor laser device 1 is converted from a divergent beam into a parallel beam by a collimator lens 2. Then, the parallel beam enters an objective lens 3 and is focused on an optical disk 4 by the objective lens 3. The reflected light from the optical disk 4 travels in the reverse direction on the aforementioned path and enters the semiconductor laser device 1 as return light.

Next, the following description is directed to a configuration of the semiconductor laser device 1.

Figure 2:
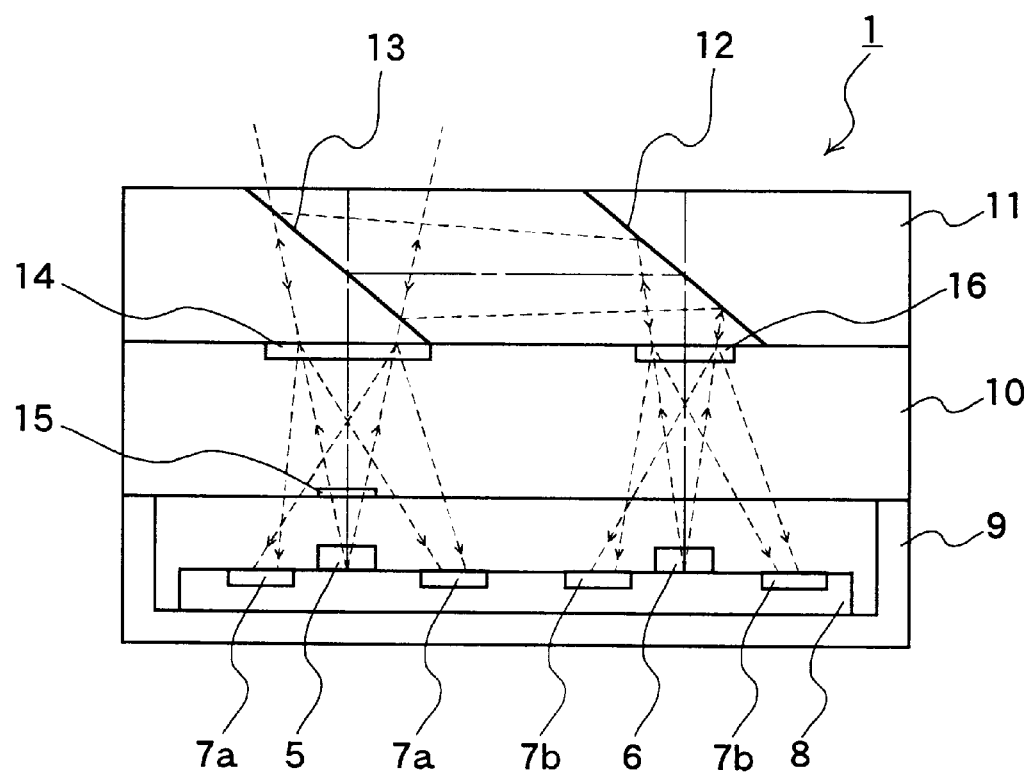
FIG. 2 is a sectional view showing a configuration of the semiconductor laser device according to the first embodiment of the present invention.
Figure 3A:
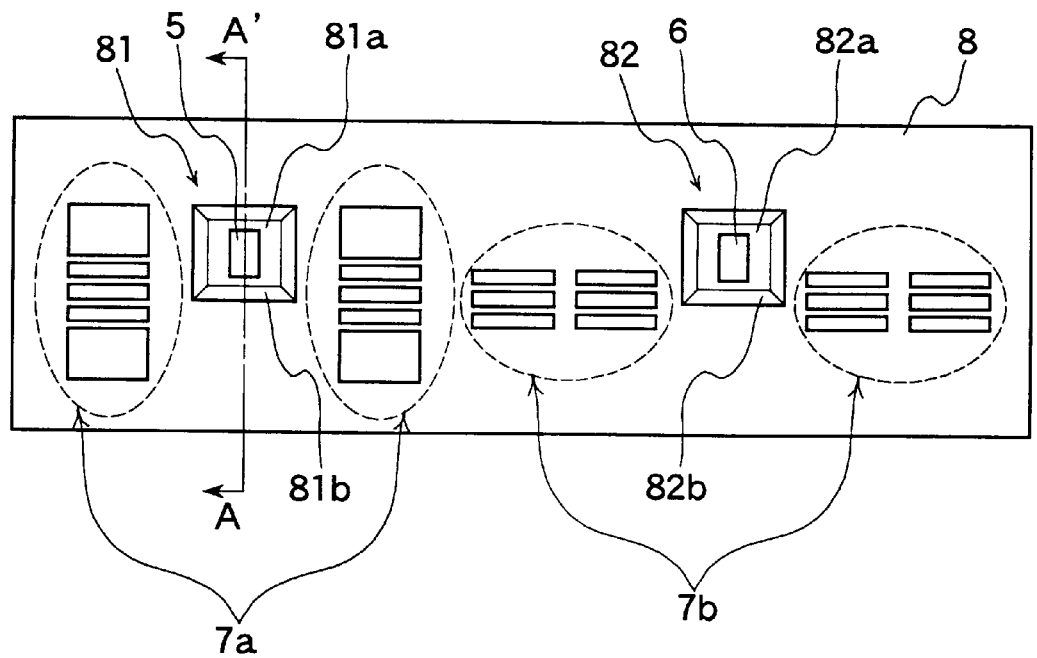
FIG. 3A is a plan view of a silicon substrate 8 of the semiconductor laser device shown in FIG. 2, viewed from the optical disk 4 side.
Figure 3B:
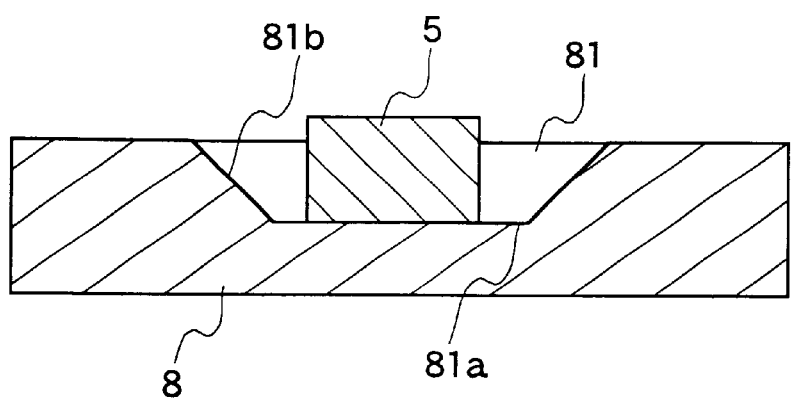
FIG. 3B is a sectional view taken along line A–A' in the silicon substrate 8 shown in FIG. 3A.

FIG. 2 is a sectional view showing the configuration of the semiconductor laser device 1 according to the present embodiment. FIG. 3A is a plan view of a silicon substrate 8 of the semiconductor laser device 1 shown in FIG. 2, viewed from the optical disk 4 side. FIG. 3B is a sectional view taken along line A–A' in the silicon substrate 8 shown in FIG. 3A.

In FIGS. 2, 3A, and 3B, two concave portions 81 and 82 are formed in the silicon substrate 8 with receiving optics 7a and 7b formed therein. A semiconductor laser element 5 with a wavelength of 780 nm and a semiconductor laser element 6 with a wavelength of 650 nm are disposed on bottom surfaces 81a and 82a of the concave portions 81 and 82, respectively. The semiconductor laser elements 5 and 6 are used for emitting laser beams for a CD format disk and a DVD format disk, respectively. In addition, the silicon substrate 8 is disposed inside a case 9 and is sealed with a hologram element 10 having diffraction gratings 14, 15 and 16 formed therein. Furthermore, a composite prism 11 with a reflecting mirror 12 and a wavelength deflection filter 13 that are combined to form a single component is placed on the hologram element 10.

In FIGS. 3A and 3B, it is preferable that the silicon substrate 8 has a principal plane that is a plane obtained when a plane (100) is rotated about an axis extending in a direction <0-11> by 5° to 15° in a direction <100>(which hereinafter is referred to as an "inclined plane α"), further preferably by 9.7° in a direction <100>. According to such a configuration, when the concave portion 81 is formed in the silicon substrate 8 by anisotropic etching using a potassium hydroxide-based etchant, a plane (111), which is the inclined plane α, as one side face 81b of the concave portion 81 can be formed to have an angle of 40° to 50° with respect to the bottom surface 81a of the concave portion 81.

Therefore, when the semiconductor laser element 5 with a wavelength of 780 nm is placed on the bottom surface 81a of the concave portion 81, the one side face 81b of the concave portion 81 serves as a reflecting mirror. Thus, emitted beams can be lead out upward in the direction substantially perpendicular to the silicon substrate 8.

In this context, the direction <0-11> denotes:

<0̄1̄1>.

That is to say, "−1" represents "1 bar".

In the silicon substrate 8, the principal plane is not limited to the inclined plane α and may be, for example, a plane obtained when a plane (001) is rotated about an axis extending in a direction <−110> by 5° to 15° in a direction <001> or a plane obtained when a plane (010) is rotated about an axis extending in a direction <−101> by 5° to 15° in a direction <010>. In other words, a plane obtained when a plane equivalent to the plane (100) is rotated about an axis extending in a direction equivalent to the direction <0–11> by 5° to 15° in a direction equivalent to the direction <100> may be used as the principal plane of the silicon substrate 8.

The following description is directed to an operation of the semiconductor laser device 1 configured as described above.

When the optical disk 4 shown in FIG. 1 corresponds to the CD format, the semiconductor laser element 5 emits a beam. The beam thus emitted is reflected by the one side face 81b of the concave portion 81 to be lead out upward and enters the diffraction grating 15, which then is diffracted by the diffraction grating 15. Thus, $0^{th}$ diffracted light and $\pm 1^{st}$ diffracted lights are produced. Then, these three types of light go through the diffraction grating 14 and the wavelength deflection filter 13 to be emitted from the semiconductor laser device 1 and are focused on the optical disk 4 shown in FIG. 1. The return light entering the semiconductor laser device 1 from the optical disk 4 goes through the wavelength deflection filter 13 and then enters the diffraction grating 14. Then, $\pm 1^{st}$ diffracted lights of the return light are lead to the receiving optics 7a and are output as a photocurrent signal. This photocurrent signal is subjected to predetermined amplification/operation, so that various servo signals (focusing/tracking error signals) and reproduced signals are detected.

On the other hand, when the optical disk 4 corresponds to the DVD format, the semiconductor laser element 6 emits a beam. The beam thus emitted is reflected by the one side face 82b of the concave portion 82 to be lead out upward, goes through the diffraction grating 16, and enters the composite prism 11, and then is reflected by the reflecting mirror 12. The reflected beam further is reflected by the wavelength deflection filter 13 to be emitted from the semiconductor laser device 1, and is focused on the optical disk 4 shown in FIG. 1. The return light entering the semiconductor laser device 1 from the optical disk 4 is reflected by the wavelength deflection filter 13 and then enters the diffraction grating 16 via the reflecting mirror 12 to be diffracted. Then, $\pm 1^{st}$ diffracted lights of the diffracted light are lead to the receiving optics 7b with a number of divided regions and are output as a photocurrent signal. This photocurrent signal is subjected to predetermined amplification/operation, so that various servo signals and reproduced signals are detected.

Figure 4:
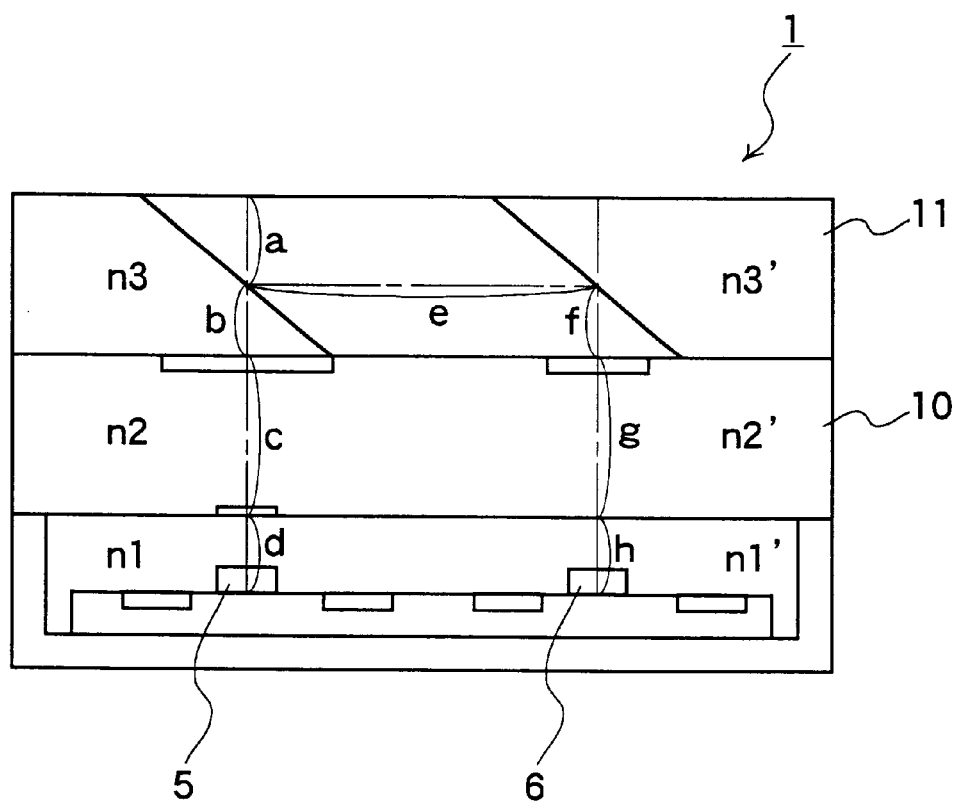
FIG. 4 is a drawing showing optical path lengths from respective semiconductor laser elements inside the semiconductor laser device according to the first embodiment of the present invention to the positions where beams leave the semiconductor laser device to the outside.

FIG. 4 is a drawing showing optical path lengths from the semiconductor laser elements 5 and 6 inside the semiconductor laser device 1, from which beams are emitted, to the positions where the beams leave the semiconductor laser device 1 to the outside. The optical path lengths of the beams emitted from the semiconductor laser elements 5 and 6 are described with respect to three divided regions of the semiconductor laser device 1.

In FIG. 4, a first region is a region of the composite prism 11, a second region a region of the hologram element 10, and a third region a region from beam emitting points of the semiconductor laser elements 5 and 6 to the lower face of the hologram element 10.

In this case, with respect to the wavelength of 780 nm, the refractive indices in the first, second, and third regions are indicated as n1, n2, and n3, respectively. With respect to the wavelength of 650 nm, the refractive indices in the first, second, and third regions are indicated as n1', n2', and n3', respectively. Furthermore, when the distances, when measured in air, of the optical paths from the semiconductor laser elements 5 and 6, from which beams are emitted, to the positions where the beams leave the semiconductor laser device 1 to the outside are expressed as L1 and L2, respectively, L1 and L2 are given by $$L1=(a+b)/n3+c/n2+d/n1,$$

and $$L2=(a+e+f)/n3'+g/n2'+h/n1',$$

respectively.

In the present embodiment, the refractive indices in the respective regions and an optical path length e are adjusted, so that the relationship of L1=L2 can be satisfied. Consequently, the semiconductor laser elements 5 and 6 can be handled as one optical source when the semiconductor laser device 1 is viewed from the outside.

As described above, in the present embodiment, the distances, when measured in air, from the semiconductor laser elements 5 and 6 to the collimator lens 2 as a focusing means are substantially equal to each other. Therefore, as shown in FIG. 1, the optical pickup device can be configured with a collimator lens 2 alone without permitting the deterioration in its characteristics and thus a very simple and small optical configuration can be obtained. In addition, the two semiconductor laser elements and receiving optics corresponding thereto are integrated, so that the size of the optical pickup device further can be reduced.

Figure 5:
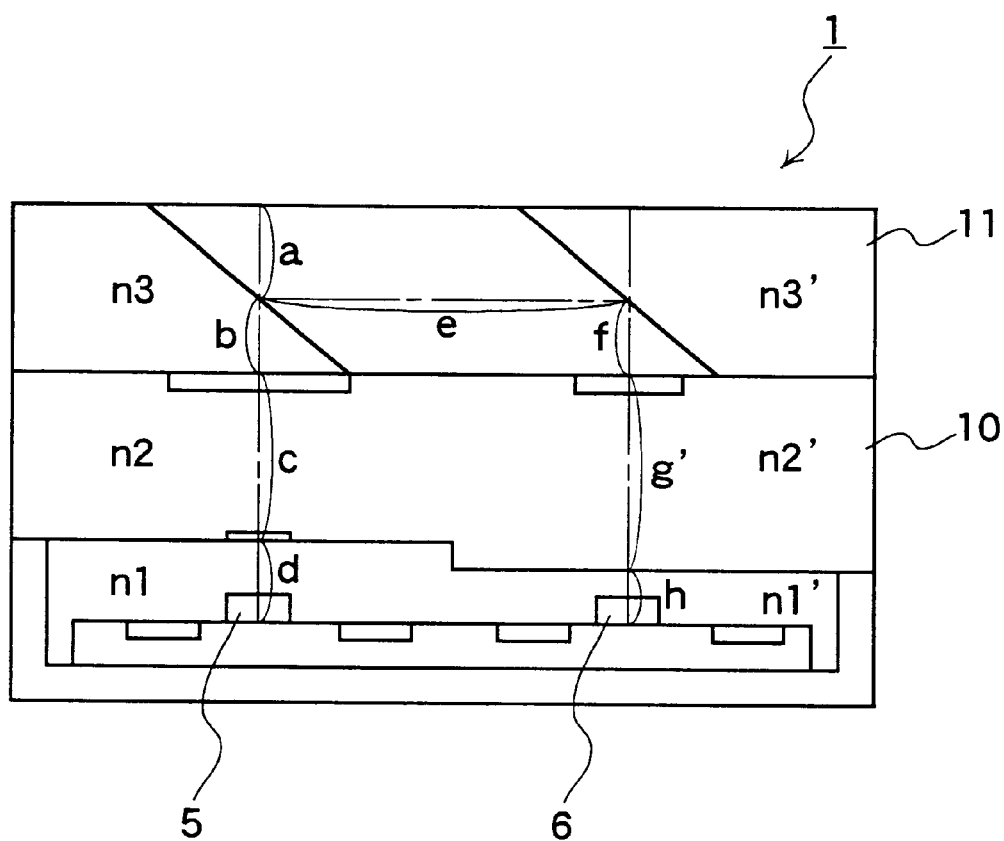
FIG. 5 is a drawing showing optical path lengths from respective semiconductor laser elements inside a semiconductor laser device according to a modified example of the first embodiment of the present invention to the positions where beams leave the semiconductor laser device to the outside.

In the above description of the present embodiment, the wavelength dispersion caused by the refractive indices and the optical path length e were adjusted. As shown in FIG. 5, however, the distances L1 and L2, when measured in air, also are allowed to be the same by the adjustment of the length of the optical elements disposed in the optical paths of beams emitted from the semiconductor laser elements 5 and 6. For example, the thickness of the hologram element 10 in the optical path of a beam emitted from the semiconductor laser element 6 changed from g to g'.

In the present embodiment, the configuration of an optical pickup device with an infinite optical system employing the collimator lens 2 and the objective lens 3 as the focusing means was illustrated and described. However, the present invention also can be applied to an optical pickup device with a finite optical system employing only an objective lens as the focusing means. In this case, the collimator lens is not required and thus the size of the optical pickup device further can be reduced and its assembly and adjustment is facilitated.

Second Embodiment

A second embodiment of the present invention is described using FIGS. 1, 6, and 7 as follows. Elements having the same functions as in the first embodiment are indicated with the same numerals.

Figure 6:
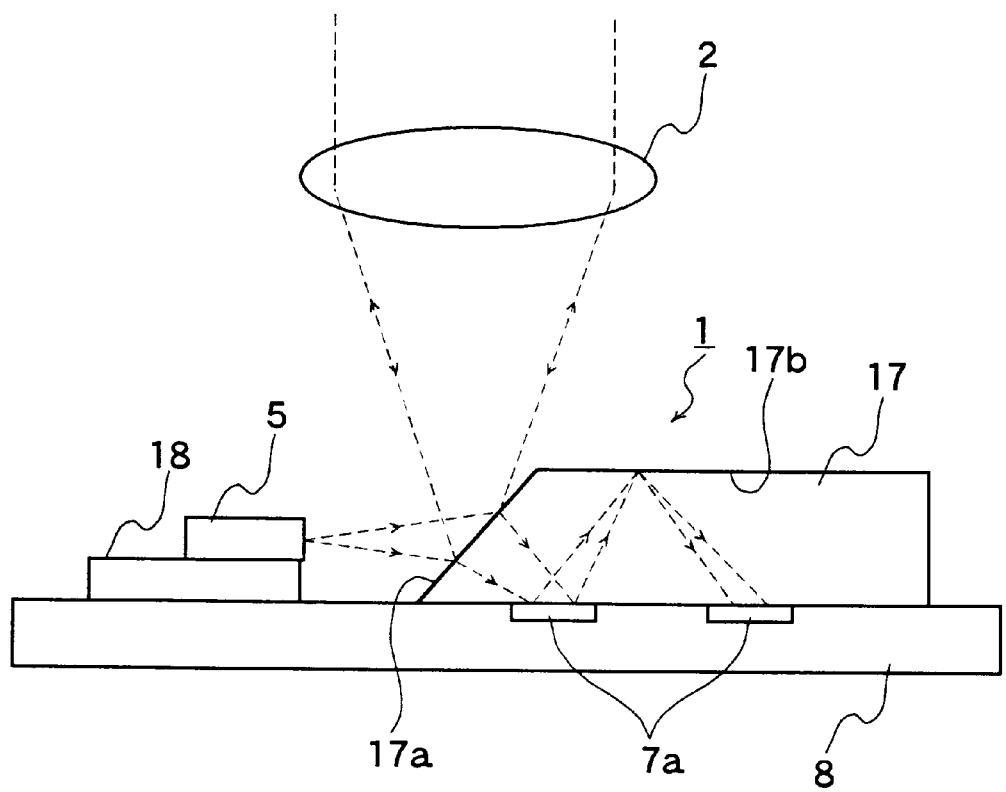
FIG. 6 is a sectional view showing a configuration of a semiconductor laser device according to a second embodiment of the present invention.
Figure 7:
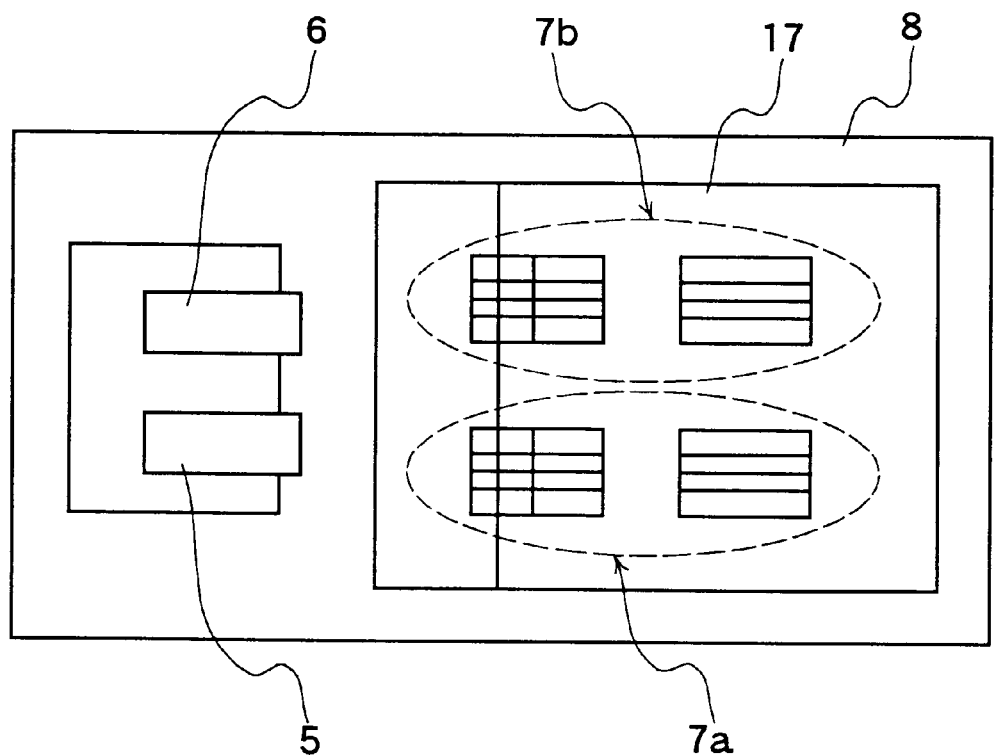
FIG. 7 is a plan view of a silicon substrate 8 of the semiconductor laser device shown in FIG. 6, viewed from the optical disk 4 side.

FIG. 6 is a sectional view showing a configuration of a semiconductor laser device 1 according to the second embodiment of the present invention. FIG. 7 is a plan view of a silicon substrate 8 of the semiconductor laser device 1 shown in FIG. 6, viewed from the optical disk 4 side.

In FIG. 6, semiconductor laser elements 5 and 6 are disposed on the silicon substrate 8 with a heat sink 18 being interposed therebetween. In the silicon substrate 8, receiving optics 7a and 7b corresponding to the semiconductor laser elements 5 and 6, respectively, are formed. In addition, a microprism 17 is placed on the receiving optics 7a and 7b. An optical pickup device having the semiconductor laser device 1 according to the present embodiment has a configuration obtained by the replacement of the semiconductor laser device 1 shown in FIG. 2 by the semiconductor laser device 1 shown in FIGS. 6 and 7, in the optical pickup device shown in FIG. 1.

The following description is directed to operations of the semiconductor laser device 1 configured as described above and the optical pickup device having the same.

When the optical disk 4 shown in FIG. 1 corresponds to the CD format, the semiconductor laser element 5 emits a beam. The beam is reflected by an inclined plane 17a of the microprism 17 to be lead upward in the direction substantially perpendicular to the silicon substrate 8 and then is emitted to the outside of the semiconductor laser device 1. Subsequently, the beam is converted into a parallel beam by the collimator lens 2 and then is focused on the optical disk 4 by the objective lens 3. The light reflected from the optical disk 4 travels in the reverse direction on the path described above. When the reflected light is incident on the inclined plane 17a of the microprism 17, part of the reflected light enters the microprism 17 and reaches the receiving optics 7a with a plurality of divided regions while being reflected between the silicon substrate 8 surface and the inner upper face 17b of the microprism 17. Then, the light is output as a photocurrent signal by the receiving optics 7a. This photocurrent signal is subjected to predetermined amplification/operation, so that various servo signals and reproduced signals are detected.

On the other hand, when the optical disk 4 shown in FIG. 1 corresponds to the DVD format, the semiconductor laser element 6 emits a beam. As in the operation described above, various servo signals and reproduced signals are detected based on a photocurrent signal output by receiving optics 7b.

According to the present embodiment, the distances, when measured in air, from the two semiconductor laser elements 5 and 6 to the collimator lens 2 as a focusing means are substantially equal to each other. As shown in FIG. 1, therefore, an optical pickup device can be configured with the collimator lens 2 alone without permitting the deterioration in its characteristics. Thus, a very simple and small optical configuration can be obtained. In addition, the two semiconductor laser elements and the receiving optics corresponding thereto are integrated, so that the size of the optical pickup device further can be reduced.

Figure 8:
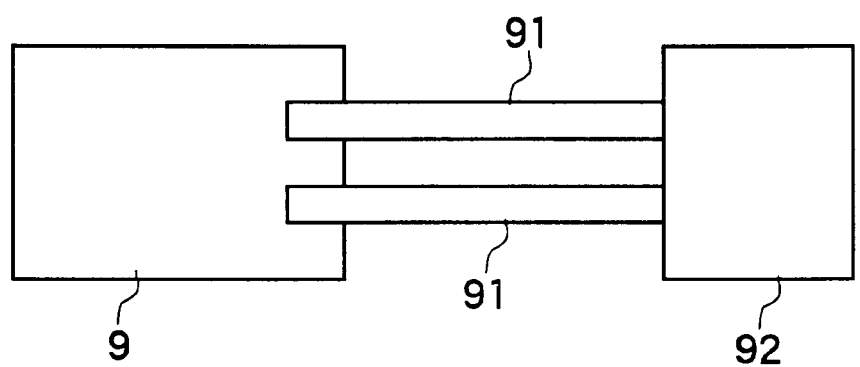
FIG. 8 is a schematic sectional view of an optical pickup device with a semiconductor laser device according to an embodiment of the present invention.
Figure 9:
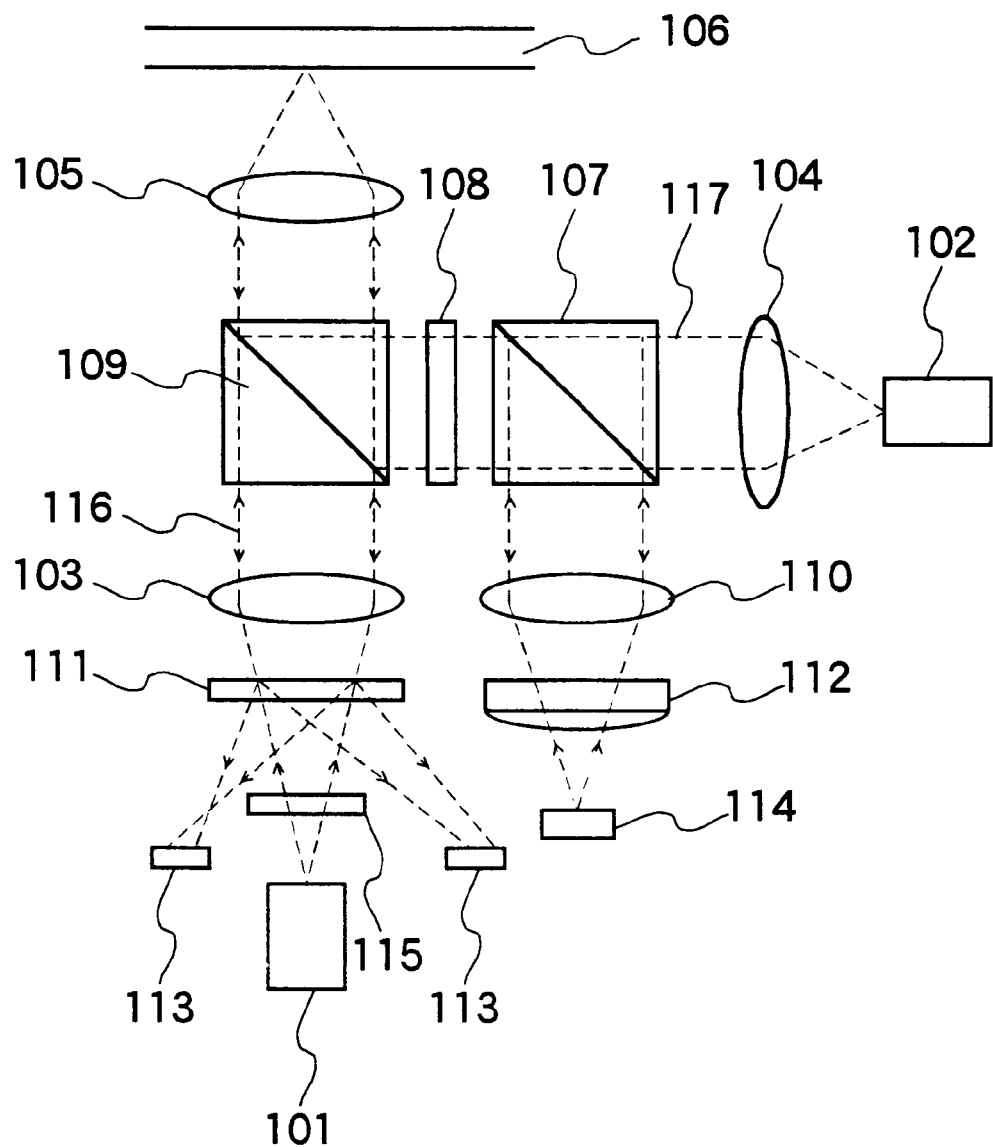
FIG. 9 is a structural view of a conventional optical pickup device.

FIG. 8 is a schematic sectional view of an optical pickup device with a semiconductor laser device according to any one of the above-mentioned embodiments of the present invention. As shown in FIG. 8, a flexible supporting member 91 formed of, for example, a metal wire is connected between a case 9 of a semiconductor laser device 1 and a supporter 92 attached to an optical disk device or the like. Thus, the case 9 is movably semifixed to the supporting member 91.

According to this configuration, all the optical components of the optical pickup device are integrally movable. Therefore, when the focusing/tracking servo is carried out with respect to an optical disk, no optical shift is caused and thus reliable recording and reproducing characteristics can be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor laser device, comprising:
   a receiving/emitting optics integrated substrate, including a first semiconductor laser element, a second semiconductor laser element, and a plurality of receiving optics that are integrated on a substrate, the first and second semiconductor laser elements having different emission wavelengths; and
   an optical element for transmitting beam from the first or second semiconductor laser element to a focusing member,
   wherein a distance L1, when measured in air, from the first semiconductor laser element to the focusing member is substantially equal to a distance L2, when measured in air, from the second semiconductor laser element to the focusing member, and the optical element is disposed in an optical path at least between the first or second semiconductor laser element and the focusing member, the optical element being configured to create the substantially equal distances.

2. The semiconductor laser device according to claim 1, wherein a difference between the distance L1 and the distance L2, when measured in air, is within ±50 μm.

3. The semiconductor laser device according to claim 1, wherein the first semiconductor laser element and the second semiconductor laser element are integrated in one chip.

4. The semiconductor laser device according to claim 1, wherein the optical element includes a member allowing a distance for which a beam emitted from the first semiconductor laser element travels to go through the optical element to be different from a distance for which a beam emitted from the second semiconductor laser element travels to go through the optical element.

5. The semiconductor laser device according to claim 1, wherein the optical element comprise a light diverging member.

6. The semiconductor laser device according to claim 5, wherein a diffraction grating is used as the light diverging member.

7. The semiconductor laser device according to claim 5, wherein a reflector is used as the light diverging member.

8. The semiconductor laser device according to claim 1, wherein the first semiconductor laser element has an emission wavelength in a 780 nm band, and the second semiconductor laser element has an emission wavelength in a 650 nm band.

9. The semiconductor laser device according to claim 5, wherein the light diverging member exhibits different diverging efficiencies depending on wavelengths.

10. The semiconductor laser device according to claim 1, wherein the receiving/emitting optics integrated substrate is a silicon substrate with a principal plane that is a plane obtained when a plane equivalent to a plane (100) is rotated about an axis extending in a direction equivalent to a direction <0–11> by 5° to 15° in a direction equivalent to a direction <100>.

11. The semiconductor laser device according to claim 10, wherein a concave portion is formed in the receiving/emitting optics integrated substrate, and the first semiconductor laser element is placed on a bottom surface of the concave portion.

12. The semiconductor laser device according to claim 11, wherein a beam emitted from the first semiconductor laser element is reflected by one side face of the concave portion.

13. The semiconductor laser device according to claim 10, wherein a concave portion is formed in the receiving/emitting optics integrated substrate, and the second semiconductor laser element is placed on a bottom surface of the concave portion.

14. The semiconductor laser device according to claim 13, wherein a beam emitted from the second semiconductor laser element is reflected by one side face of the concave portion.

15. The semiconductor laser device according to claim 1, wherein the receiving/emitting optics integrated substrate and the optical element are disposed in one case.

16. The semiconductor laser device according to claim 1, wherein the optical element is placed on the receiving/emitting optics integrated substrate.

17. An optical pickup device, comprising:
   a focusing member; and
   a semiconductor laser device, comprising:
      a receiving/emitting optics integrated substrate, disposed in a case, including a first semiconductor laser element, a second semiconductor laser element, and a plurality of receiving optics that are integrated on a substrate, the first and second semiconductor laser elements having different emission wavelengths; and
      an optical element, disposed in the same case as that including the receiving/emitting for transmitting beam from the first or second semiconductor laser element to the focusing member optics integrated substrate,
      wherein a distance L1, when measured in air, from the first semiconductor laser element to the focusing member is substantially equal to a distance L2, when measured in air, from the second semiconductor laser element to the focusing member,
      wherein the focusing member is positioned to be fixed to the case of the semiconductor laser device and the optical element is configured to create the substantially equal distances.

18. The optical pickup device according to claim 17, further comprising a supporting member, wherein the case and the supporting member are connected by a supporter, and the case is movably semifixed to the supporting member.

* * * * *